United States Patent
Seong et al.

(10) Patent No.: US 9,209,437 B2
(45) Date of Patent: Dec. 8, 2015

(54) SECONDARY BATTERY HAVING ELECTROLYTE INJECTION HOLE AND METHOD OF FABRICATING THE SAME

(75) Inventors: Jae-Il Seong, Suwon-si (KR); Hideaki Yoshio, Suwon-si (KR); Jai-Hwan Joo, Suwon-si (KR); Jin-Wook Kim, Suwon-si (KR); Soon-Ki Woo, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 660 days.

(21) Appl. No.: 12/489,852

(22) Filed: Jun. 23, 2009

(65) Prior Publication Data

US 2010/0003583 A1    Jan. 7, 2010

(30) Foreign Application Priority Data

Jul. 3, 2008    (KR) .................. 10-2008-0064401

(51) Int. Cl.
| | |
|---|---|
| *H01M 10/02* | (2006.01) |
| *H01M 2/04* | (2006.01) |
| *H01M 2/08* | (2006.01) |
| *H01M 2/36* | (2006.01) |

(52) U.S. Cl.
CPC .............. *H01M 2/0478* (2013.01); *H01M 2/08* (2013.01); *H01M 2/361* (2013.01); *H01M 2/365* (2013.01); *Y10T 29/4911* (2015.01)

(58) Field of Classification Search
CPC ...................................................... H01M 10/02
USPC ......................................................... 429/72
See application file for complete search history.

(56) References Cited

U.S. PATENT DOCUMENTS

| | | | |
|---|---|---|---|
| 8,021,774 | B2 | 9/2011 | Woo |
| 2001/0012582 | A1* | 8/2001 | Kim .............................. 429/184 |
| 2004/0224227 | A1* | 11/2004 | Ozawa et al. ................. 429/211 |
| 2005/0221176 | A1 | 10/2005 | Kim |
| 2006/0099501 | A1* | 5/2006 | Kim et al. ..................... 429/174 |
| 2007/0202397 | A1* | 8/2007 | Cho ............................. 429/174 |
| 2007/0224491 | A1 | 9/2007 | Woo |
| 2007/0264565 | A1 | 11/2007 | Yeo |
| 2007/0275301 | A1* | 11/2007 | Asahina et al. ............... 429/181 |
| 2010/0255367 | A1 | 10/2010 | Woo |

FOREIGN PATENT DOCUMENTS

| | | |
|---|---|---|
| CN | 1677709 | 10/2005 |
| CN | 101047265 | 10/2007 |
| EP | 1 840 985 A2 | 10/2007 |
| JP | 56-138855 | 10/1981 |

(Continued)

OTHER PUBLICATIONS

Chinese Office Action in the corresponding Chinese Patent Application No. 200910158718.2 dated May 12, 2011.

(Continued)

*Primary Examiner* — Jacob Marks
(74) *Attorney, Agent, or Firm* — Knobbe Martens Olson & Bear LLP

(57) ABSTRACT

A secondary battery including a cap assembly, the cap assembly including a cap plate having an electrolyte injection hole. The electrolyte injection hole includes a tapered portion having a roughened surface. The secondary battery further includes a sealing member located in the electrolyte injection hole, to seal the electrolyte injection hole. The sealing member includes a cap and a resin coated on the cap.

14 Claims, 13 Drawing Sheets

(56) References Cited

FOREIGN PATENT DOCUMENTS

| | | |
|---|---|---|
| JP | 09-129201 | 5/1997 |
| JP | 11-154506 | 6/1999 |
| JP | P2000-243380 A | 9/2000 |
| JP | 2000321585 | 11/2000 |
| JP | 2001-313022 | 11/2001 |
| JP | P2001-313022 A | 11/2001 |
| JP | P2005-30483 A | 2/2005 |
| JP | 2006-196394 | 7/2006 |
| JP | 2007-234579 | 9/2007 |
| JP | 2007-265967 | 11/2007 |
| JP | 2007-317394 | 12/2007 |
| KR | 10-2006-0088312 | 8/2006 |
| KR | 10-0686857 | 2/2007 |
| KR | 10-2007-0025720 | 3/2007 |
| KR | 2007-33762 | 3/2007 |
| KR | 10-2007-0096643 | 10/2007 |
| WO | WO 2007/069820 A1 | 6/2007 |

OTHER PUBLICATIONS

European Search Report issued on Sep. 1, 2009 in corresponding European Patent Application No. 09164340.
Korean Office Action issued Feb. 25, 2010 in corresponding Korean Patent Application No. 10-2008-0064401.
Office Action dated Oct. 27, 2011 in corresponding Chinese Patent Application No. 200910158718.2.
Office Action dated Jul. 24, 2012 in corresponding Japanese Patent Application No. 2009-158656.
Office Action dated Feb. 29, 2012 in corresponding Chinese Patent Application No. 200910158718.2.
Office Action dated Feb. 12, 2014 in Japanese Patent Application No. 2012-235023, which claims priority to Korean priority Application No. 10-2008-0064401.

* cited by examiner

SECONDARY BATTERY HAVING ELECTROLYTE INJECTION HOLE AND METHOD OF FABRICATING THE SAME

CROSS-REFERENCE TO RELATED APPLICATION

This application claims the benefit of Korean Patent Application No. 10-2008-0064401, filed Jul. 3, 2008, in the Korean Intellectual Property Office, the disclosure of which is hereby incorporated herein, by reference, in its entirety.

BACKGROUND OF THE INVENTION

1. Field of the Invention

Aspects of the present invention relate to a secondary battery having an electrolyte injection hole and a method of fabricating the same.

2. Description of the Related Art

In recent years, compact, lightweight, portable electronic/electric devices, such as cellular phones, notebook computers, and camcorders, have been actively developed and produced. Such devices include battery packs having rechargeable batteries, for portable operations. Examples of rechargeable (secondary) batteries include nickel-cadmium (Ni—Cd) batteries, nickel-metal hydride (Ni-MH) batteries, and lithium (Li) batteries.

Li secondary batteries are widely used in portable electronic devices, due to having an operating voltage that is three times higher than that of Ni—Cd batteries and Ni-MH batteries. In addition, Li secondary batteries have a higher energy density per unit weight. Li secondary batteries may be lithium ion batteries that include a liquid electrolyte, or lithium polymer batteries that include a polymer electrolyte. Li secondary batteries may also be cylindrical, prismatic, or pouch-shaped.

In general, a lithium secondary battery pack includes: a bare cell; a can to house the bare cell; and a protective circuit assembly electrically connected to the bare cell, to prevent the bare cell from being overcharged and/or over-discharged. The bare cell includes: an electrode assembly that includes; a can to house the electrode assembly; and a cap assembly to seal the can. The electrode assembly includes a positive electrode plate, a negative electrode plate, and a separator disposed therebetween. The electrode plates each have a collector that is coated with an active material, and an electrode tab connected to the collector. The protective circuit assembly includes a protective circuit board for controlling voltage and/or current when the bare cell is charged and/or discharged. The battery pack can include: a lower case formed between the protective circuit board and the bare cell, to provide a space where the protective circuit board can be placed; and an upper case coupled to the lower case, to protect the protective circuit board from external impacts.

FIG. 1 is a cross-sectional view of a conventional secondary battery 10, including an electrolyte injection hole 26. Referring to FIG. 1, the secondary battery 10 includes a can 11, an electrode assembly 12 accommodated in the can 11, and a cap assembly 20 coupled to the can 11.

The electrode assembly 12 includes a positive electrode 13, a separator 14, and a negative electrode 15, which are wound together. A positive electrode tab 16 and a negative electrode tab 17 are drawn from the positive electrode 13 and the negative electrode 15, respectively. An insulating case 18 is provided on the electrode assembly 12, to electrically insulate the electrode assembly 12 from the cap assembly 20 and to cover an upper portion of the electrode assembly 12.

The cap assembly 20 includes a cap plate 21 coupled to an upper portion of the can 11, an electrode terminal 23 that is insulated from the cap plate 21 via a gasket 22, an insulating plate 24 provided on a lower surface of the cap plate 21, and a terminal plate 25 provided on a lower surface of the insulating plate 24, which is electrically connected to the electrode terminal 23.

The positive electrode tab 16 is electrically connected to the cap plate 21, and the negative electrode tab 17 is electrically connected to the electrode terminal 23, through the terminal plate 25. The cap plate 21 includes the electrolyte injection hole 26, which is a passage for injecting an electrolyte into the can 11. A sealing member 27 is coupled to the electrolyte injection hole 26, to seal the same.

The sealing member 27 is normally an aluminum ball that is pressed into the electrolyte injection hole 26, by a pressing device. After the ball is pressed into the electrolyte injection hole 26, laser welding is performed to form a welded portion 28, along a boundary between the ball and the cap plate 21. A UV activated hardener is coated around the periphery of the electrolyte injection hole 26 and on the sealing member 26, and is then cured by UV light.

However, it is difficult to properly position the ball in the electrolyte injection hole 26, due to the shape of the conventional electrolyte injection hole 26. This reduces the strength of the seal, which may result in leakage of the electrolyte from the can.

In addition, since an upper surface of the ball cannot be precisely rounded, the welded portion 28 may not be correctly formed, resulting in leakage of the electrolyte. In particular, when the electrolyte leaks through the conventional electrolyte injection hole 26, during the welding process, the leaked electrolyte causes a pin hole to be formed between the ball and an inner circumference of the electrolyte injection hole 26. This degrades the sealing characteristics of the electrolyte injection hole 26.

SUMMARY OF THE INVENTION

An aspect of the present invention provides a secondary battery having an electrolyte injection hole, which has improved sealing characteristics.

Another aspect of the present invention provides a secondary battery having high productivity, by eliminating the need for a cap welding process.

Yet another aspect of the present invention provides a secondary battery capable of suppressing the formation of a pin hole, by eliminating the need for a welding process.

According to an exemplary embodiment of the present invention, a member for sealing an electrolyte injection hole includes a cap and a resin coated on an outer circumference of the cap.

According to an exemplary embodiment of the present invention, the resin may be coated to a thickness of from 1.75 μm to 20 μm. For example, the resin may be coated to a thickness of from 6 μm to 10 μm.

According to an exemplary embodiment of the present invention, the resin may be a polyimide resin, a fluorine resin, or a natural-rubber resin.

According to another exemplary embodiment of the present invention, a cap assembly has a cap plate, and he cap plate includes an electrolyte injection hole. The electrolyte injection hole includes a tapered portion having a roughened surface.

According to yet another exemplary embodiment of the present invention, a secondary battery has a cap assembly. The cap assembly includes a cap plate including an electrolyte injection hole. The electrolyte injection hole includes an upper tapered portion having a roughened surface.

According to an exemplary embodiment of the present invention, the tapered portion may be formed such that a size of the electrolyte injection hole is reduced, from an upper surface of the cap plate to a lower surface thereof.

According to an exemplary embodiment of the present invention, the tapered portion may have a depth corresponding to from 37.5% to 62.5% of the thickness of the cap plate.

According to an exemplary embodiment of the present invention, the tapered portion may have an inner angle of from 43 to 68°.

According to an exemplary embodiment of the present invention, the tapered portion may have a taper angle of from 56 to 69°, with respect to the inner surface of the cap plate.

According to an exemplary embodiment of the present invention, the tapered portion may have a surface roughness of from 1 μm to 17 μm. For example, the tapered portion may have a surface roughness of from 5 μm to 11 μm.

According to an exemplary embodiment of the present invention, the secondary battery may further include a sealing member located in the electrolyte injection hole, to seal the electrolyte injection hole.

According to an exemplary embodiment of the present invention, the resin is compressed against the tapered portion of the electrolyte injection hole, such that the thickness thereof is reduced by from 40 to 60%.

According to an exemplary embodiment of the present invention, the secondary battery may further include a UV hardened layer coated on the periphery of the electrolyte injection hole and the sealing member.

According to yet another exemplary embodiment of the present invention, a method of fabricating a secondary battery includes: preparing a bare cell, by injecting an electrolyte through an electrolyte injection hole of a cap plate of the bare cell; locating a sealing member on the electrolyte injection hole; and pressing the sealing member into the electrolyte injection hole, using a pressing device. The electrolyte injection hole includes an upper tapered portion having a surface roughness, and the sealing member includes a cap and a resin coated on an outer circumference of the cap.

According to an exemplary embodiment of the present invention, the sealing member may be pressed into the electrolyte injection hole, using a pressing force of from 50N to 190N. For example, the sealing member may be pressed into the electrolyte injection hole using a pressing force of from 90N to 150N.

The predetermined portion of the resin that is pressed on the tapered portion of the electrolyte injection hole, may have a thickness corresponding to from 40 to 60% of the thickness thereof, prior to the sealing of the electrolyte injection hole.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EXEMPLARY EMBODIMENTS

Figure 1:
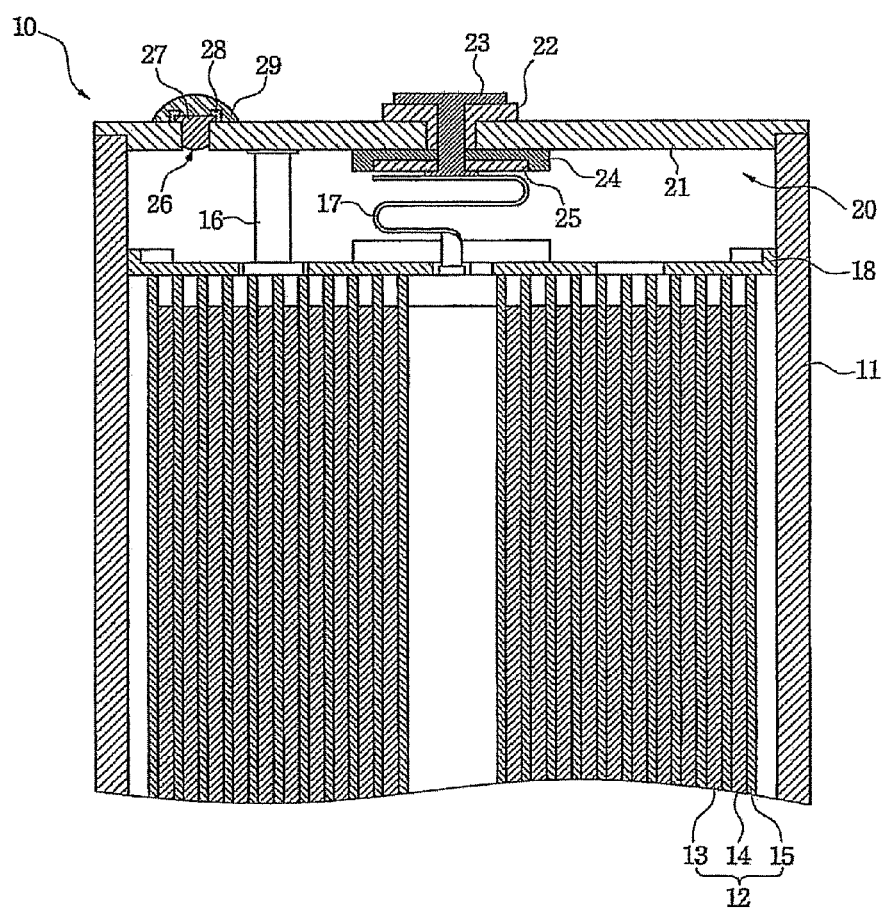
FIG. 1 is a cross-sectional view of a conventional secondary battery including an electrolyte injection hole.

Reference will now be made in detail to the exemplary embodiments of the present invention, examples of which are shown in the accompanying drawings, wherein like reference numerals refer to like elements throughout the specification. The exemplary embodiments are described below, in order to explain the aspects of the present invention, by referring to the figures.

Figure 2A:
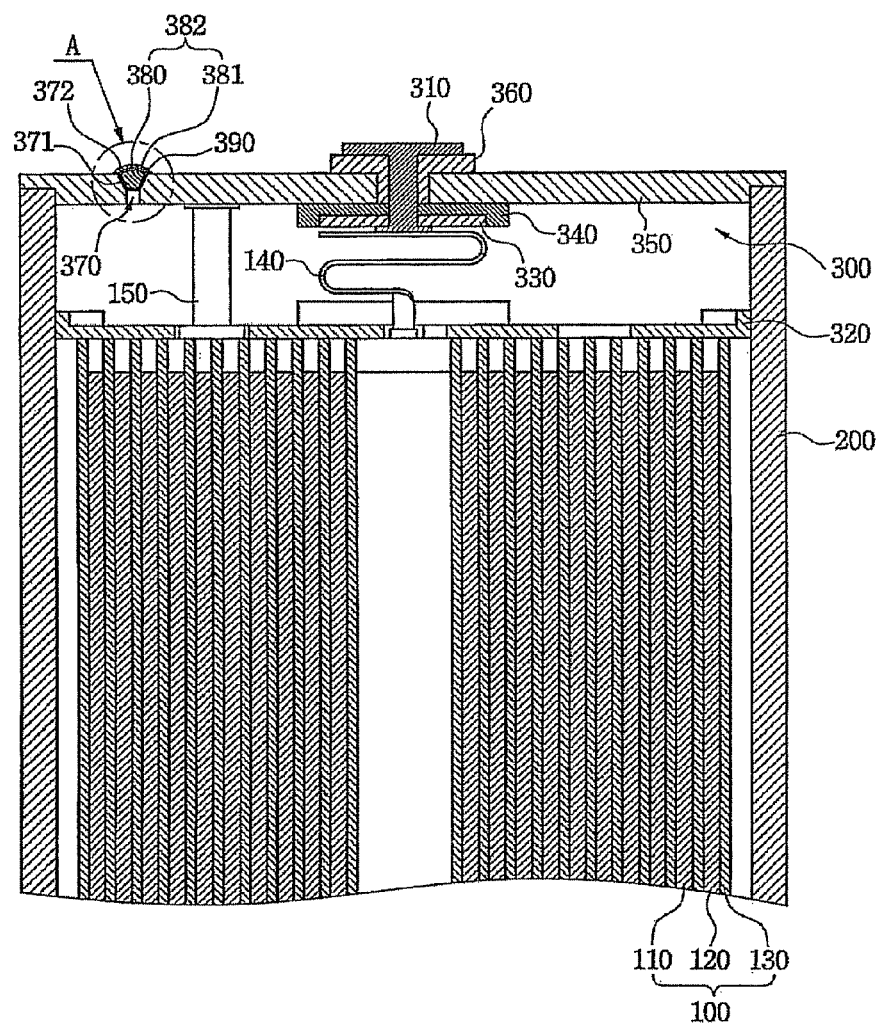
FIG. 2A is a cross-sectional view of a secondary battery having an electrolyte injection hole, according to an exemplary embodiment of the present invention.
Figure 2B:
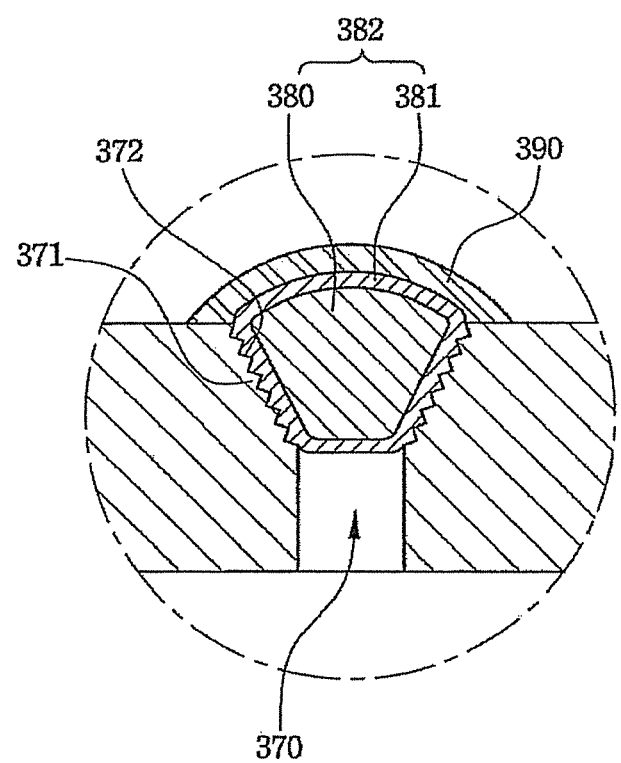
FIG. 2B is an enlarged cross-sectional view of region A, of FIG. 2A.

FIG. 2A is a cross-sectional view of a secondary battery, according to a first exemplary embodiment of the present invention, and FIG. 2B is an enlarged cross-sectional view of region A, of FIG. 2A. Referring to FIGS. 2A and 2B, the secondary battery may include: a bare cell and a protective circuit board (not shown) coupled to the bare cell, to control a voltage and/or current when the bare cell is charged and/or discharged. The bare cell includes an electrode assembly 100, a can 200 to house the electrode assembly 100 and an electrolyte, and a cap assembly 300.

The electrode assembly 100 includes a positive electrode 110, a separator 130, and a negative electrode 120, which are spirally wound together. The can 200 is formed of aluminum, or an aluminum alloy, and is generally rectangular. The electrode assembly 100 is inserted into the can 200, through an opening of the can 200.

The cap assembly 300 includes a flat cap plate 350 that corresponds to the upper opening of the can 200. The cap plate 350 includes a hole through which an electrode terminal passes. The cap assembly 300 further includes a tube-shaped gasket 360 that is provided outside the electrode terminal 310, which passes through the cap plate 350. The gasket 360 insulates the electrode terminal 310 from the cap plate 350.

The cap plate 350 seals the opening of the can 200, and the electrode terminal 310 is insulated from the cap plate 350, by the gasket 360. The cap assembly 300 further includes an insulating plate 340 centrally disposed under the cap plate 350, and around the hole. The cap assembly 300 also includes a terminal plate 330 that is provided below the insulating plate 340.

A positive electrode tab 150 extends from the positive electrode 110 and is welded to the lower surface of the cap plate 350. A negative electrode tab 140 extends from the negative electrode 120, is folded in a zigzag shape, and is welded to a lower end of the electrode terminal 310.

An insulating case 320 is provided on the electrode assembly 100, to electrically insulate the electrode assembly 100 from the cap assembly 300, and to cover an upper portion of the electrode assembly 100. The insulating case 320 is made of an insulating polymer resin, such as polypropylene, for example. The insulating case 320 may have a hole, through which the negative electrode tab 140, and/or the electrolyte, can pass.

The cap plate 350 further includes an electrolyte injection hole 370 formed at one side thereof. A sealing member 382 is provided to seal the electrolyte injection hole 370, after the electrolyte is injected. In this case, the electrolyte injection hole 370 includes a tapered portion 371 having a roughened surface 372. The sealing member 382 includes a cap 380 and a resin 381 that is coated on the cap 380.

A UV curable resin is coated on the periphery of the electrolyte injection hole 370 and on the sealing member 382. A UV hardening process is performed on the resin, to form a UV hardened layer 390. This improves the sealing of the electrolyte injection hole 370.

Figure 3A:
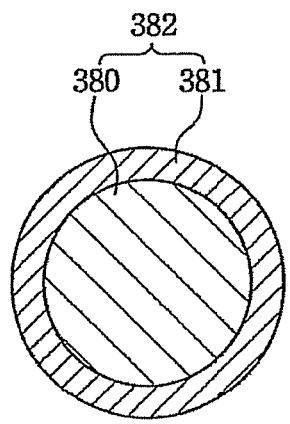
FIG. 3A is a cross-sectional view of a sealing member, according to aspects of the present invention.
Figure 3B:
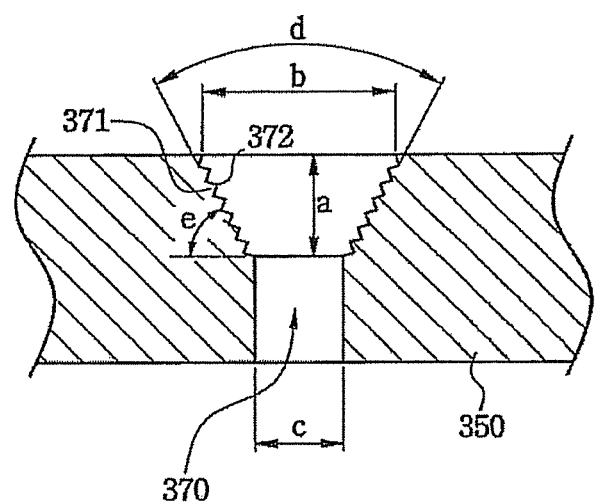
FIG. 3B is a cross-sectional view illustrating an electrolyte injection hole, according to aspects of the present invention.

FIG. 3A is a cross-sectional view of the sealing member 382, according to aspects of the present invention, and FIG. 3B is a cross-sectional view illustrating the electrolyte injection hole 370, according to aspects of the present invention. Referring to FIG. 3A, the sealing member 382 includes a cap 380 and a resin 381 coated on an outer circumference of the cap 380. The sealing member 382 may be made of aluminum, an aluminum alloy, plastic, or stainless steel, for example. The sealing member 382 may be ball-shaped or pin-shaped.

According to some embodiments, the cap 380 may be made of aluminum, to improve the sealing of the electrolyte injection hole 370. The cap 380 may be ball-shaped, in order to improve the coating of the cap 380 with the resin 381. The size of the cap 380 may be varied, according to the size of the electrolyte injection hole 370. The cap 380 may have a diameter of from 0.9 to 1.3 mm, for example, but the present invention is not limited thereto.

The resin 381 improves the seal between the electrolyte injection hole 370 and the cap 380. The resin 381 may be a polyimide resin, a fluorine resin, or a natural-rubber resin. The natural-rubber resin may include butadiene rubber (BR), isobutylene-isoprene rubber (IIR), or ethylene propylene diene monomer (EPDM) rubber, for example. Preferably, the resin 381 in the present invention may be a polyimide series resin or a fluorine series resin for improving a sealing force between the electrolyte injection hole and the sealing member. More preferably, the resin 381 may be a polyimide series resin, as described above.

The resin 381 may be coated to a thickness of from 1.75 μm to 20 μm, or more particularly, to a thickness of from 6 μm to 10 μm. A thickness of less than 1.75 μm may not be sufficient to withstand leak pressures generally associated with secondary batteries. A thickness exceeding 20 μm may unnecessarily complicate a fabrication process. Although a thickness exceeding 20 μm may be fabricated, the sealing force may be reduced, due to an associated increase in total size of the sealing member 382.

Herein, the "leak pressure" refers to a pressure generated inside of the battery, when the battery is operated, which results the leakage of an electrolyte, through an electrolyte injection hole. For example, a sealing member rated at a leak pressure of 3 kgf/cm$^2$ would leak, if the pressure inside a battery exceeded 3 kgf/cm$^2$.

Referring to FIG. 3B, the electrolyte injection hole 370 includes a tapered portion 371, which has a roughened surface 372, and a non-tapered portion that extends therefrom. In this case, the tapered portion 371 is formed so as to narrow the electrolyte injection hole, from the outer surface of the cap plate 350 to the inner surface thereof, as shown in FIG. 3B. The tapered portion is also formed to have a depth from the upper surface of the cap plate to a predetermined thickness of the cap plate.

The thickness of the cap plate 350 may vary, according to battery type. For example, the thickness of the cap plate 350 is generally from about 0.7 to 1.0 mm, but the present invention is not limited thereto. In the present invention, the depth of the tapered portion 371 extending from the upper surface of the cap plate to the predetermined thickness thereof is defined as "a depth of the tapered portion" ("a" in FIG. 3B).

The depth a of the tapered portion may be from 37.5% to 62.5% of the thickness of the cap plate 350. A depth outside of this range may reduce the leak pressure that the sealing member 382 can withstand.

The electrolyte injection hole 370 has an upper diameter "b" and a lower diameter "c", which may be different. For example, the upper diameter b ranges from 1.1 mm to 1.5 mm, and the lower diameter c ranges from 0.7 mm to 1.1 mm, such that the upper diameter b is larger than the lower diameter c.

If the upper diameter b of the electrolyte injection hole 370 is too small, the injection of the electrolyte may be impeded, and if the upper diameter b is too large, the sealing of the electrolyte injection hole 370 may be difficult. However, the present invention is not limited to any particular upper diameter.

If the lower diameter c of the electrolyte injection hole 372 is too small, the injection of the electrolyte may be impeded. If the lower diameter c is too large, it may cause an increase in the upper diameter b, which may make it difficult to seal the electrolyte injection hole 370. However, the present invention is not limited to any particular lower diameter.

An angle "d" (inner angle of the tapered portion), between opposing sides of the tapered portion 371, may be from about 43 to 68°. Accordingly, a corresponding angle "e" (taper angle) may be from about 56 to 69°, with respect to the inner surface of the cap plate.

In the present invention, the angle d between the left tapered portion and the right tapered portion is defined as "an inner angle of the tapered portion" and the angle e of the tapered portion with respect to the lower surface of the cap plate is defined as "a taper angle." The inner angle d of the tapered portion is calculated according to the thickness of the cap plate 350, the upper and lower diameters of the electrolyte injection hole 370, and the preferred depth of the tapered portion 371. For example, when the thickness of the cap plate 350 is 0.8 mm, the upper diameter b of the electrolyte injection hole 370 is 1.3 mm, the lower diameter c of the electrolyte injection hole 370 is 0.9 mm, and the depth a can be 0.3 mm, 0.4 mm, or 0.5 mm (corresponding to 37.5%, 50%, or 62.5% of the thickness of the cap plate 350), and the inner angle d of the tapered portion 371 can be about 43°, 53°, or 68°, depending on the depth a of the tapered portion 371, for example.

The tapered portion 371 has a roughened surface 372. The roughened surface 372 can increase the friction and adhesion between the sealing member 382 and the electrolyte injection hole 370. The roughened surface 372 can effectively prevent the leakage of the electrolyte, by increasing the distance the electrolyte must travel, while leaking between the sealing member 382 and the electrolyte injection hole 370. The tapered portion 371 can have a surface roughness of from 1 μm to 17 μm, or from 5 μm to 11 μm, for example. A surface roughness outside of this range may not be effective in enhancing the sealing thereof.

Figure 4A:
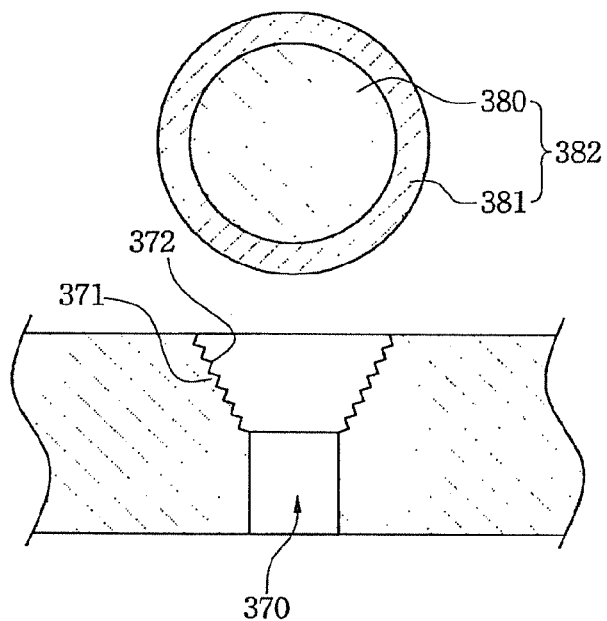
FIGS. 4A to 4C are cross-sectional views illustrating a method of sealing a electrolyte injection hole, according to aspects of the present invention.
Figure 4B:
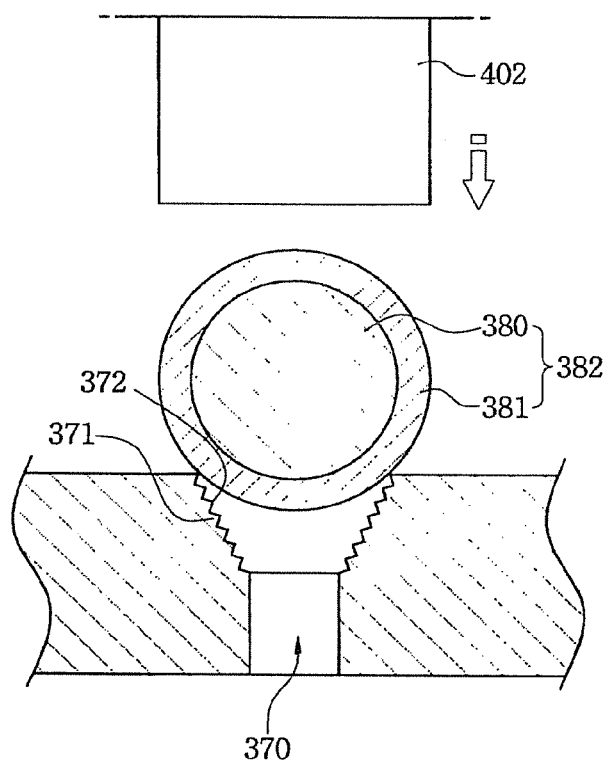
Figure 4C:
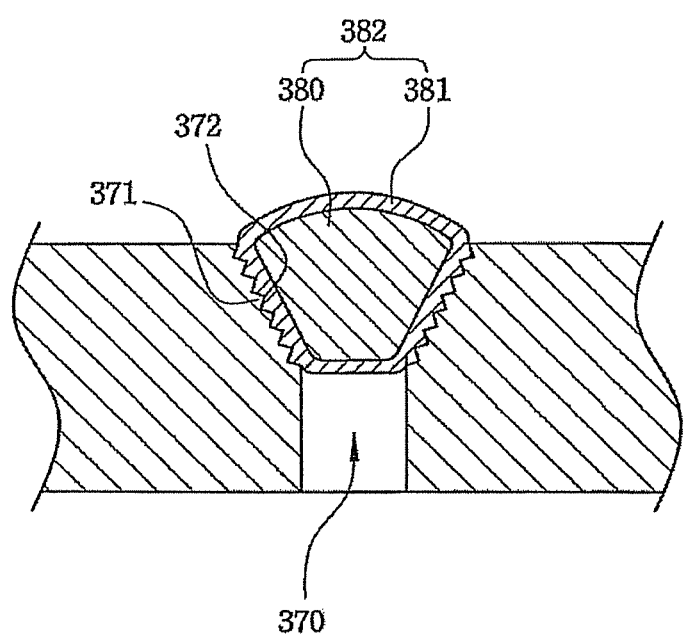

FIGS. 4A to 4C are cross-sectional views sequentially illustrating a method of sealing an electrolyte injection hole 370, according to aspects of the present invention. Referring to FIG. 4A, a sealing member 382 is positioned adjacent to an electrolyte injection hole 370 of a cap plate. The sealing member 382 includes a cap 380, and a resin 381 coated on an outer circumference of the cap 380. The electrolyte injection hole 370 includes an upper tapered portion 371 having a roughened surface 372.

Referring to FIG. 4B, the sealing member 382 is pressed into the electrolyte injection hole 370, by a pressing device 402. In this case, the maximum diameter of the electrolyte injection hole 370 is larger than that of conventional electrolyte injection hole, which allows the sealing member 382 to be more accurately positioned in the electrolyte injection hole 370.

The pressing device 402 may apply a pressing force of from 50N to 190N, or from 90N to 150N, to the sealing member 382. A pressing force outside of this range may not be appropriate for proper sealing.

Referring to FIG. 4C, the sealing member 382 is deformed by the pressing device 402, such that it corresponds to the electrolyte injection hole 370, and thereby seals the electrolyte injection hole 370. The resin layer 381 conforms to the roughened surface 372 of the tapered portion 371, which increases the adhesion therebetween. This results in improved sealing characteristics. In addition, due to the pressing, the thickness of the resin layer 381, where the resin layer 380 contacts the tapered portion 371, is reduced by about 40 to 60%, as compared to the thickness of the resin layer 381 before the pressing.

While not shown, a UV curable resin is applied to the sealing member and the adjacent surface of the cap plate 350 and is then cured with UV light, so as to form the UV hardened layer 390 shown in FIG. 2B. This further improves the sealing of the electrolyte injection hole 370.

Figure 5A:
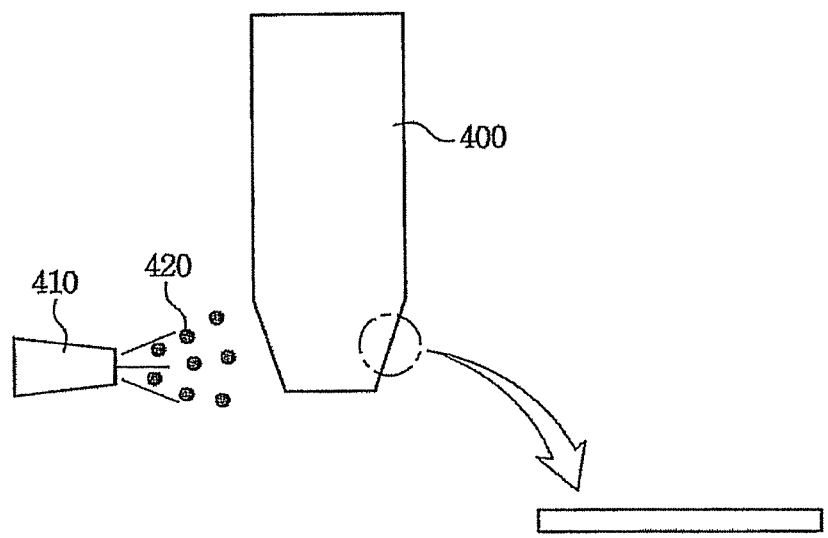
FIGS. 5A to 5F are schematic diagrams illustrating a method of forming an electrolyte injection hole, according to aspects of the present invention.

FIGS. 5A to 5F are schematic diagrams illustrating a method of forming an electrolyte injection hole 370, according to aspects of the present invention. Referring to FIG. 5A, a press punch 400, having a tapered portion, is spray coated with diamonds 420, using a sprayer 410. The angle of the tapered portion can be adjusted, according to the angle of a tapered portion of electrolyte injection hole, which is to be formed by the press punch 400. The surface roughness of the tapered portion of the electrolyte injection hole can be adjusted, by adjusting the size and/or the amount of the diamonds.

Figure 5B:
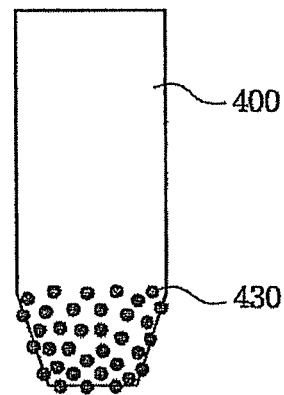
Figure 5C:
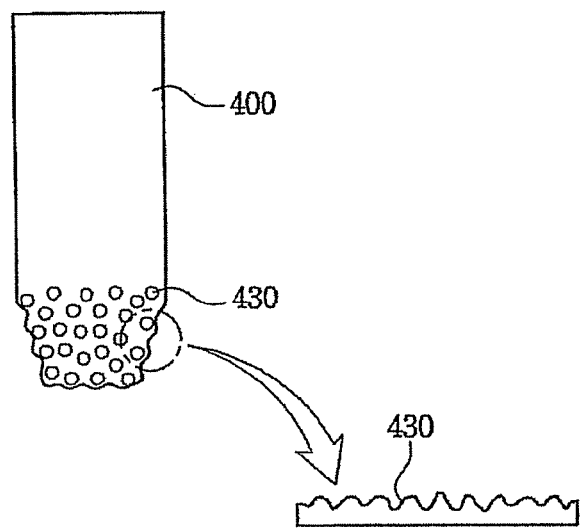
Figure 5D:
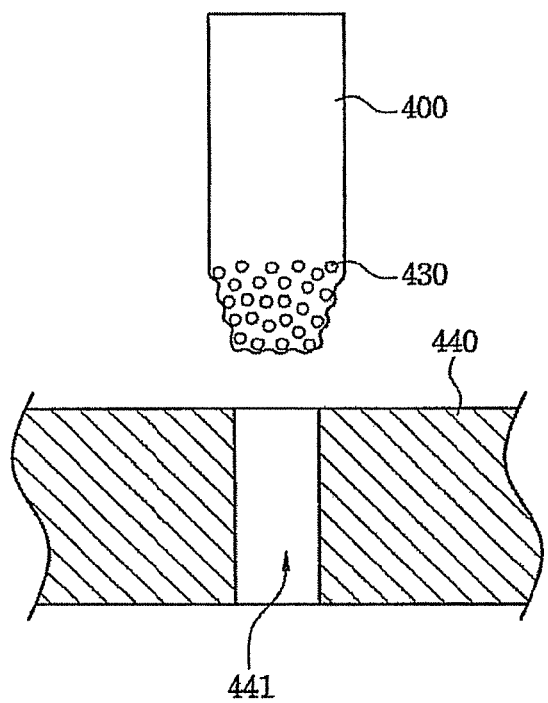
Figure 5E:
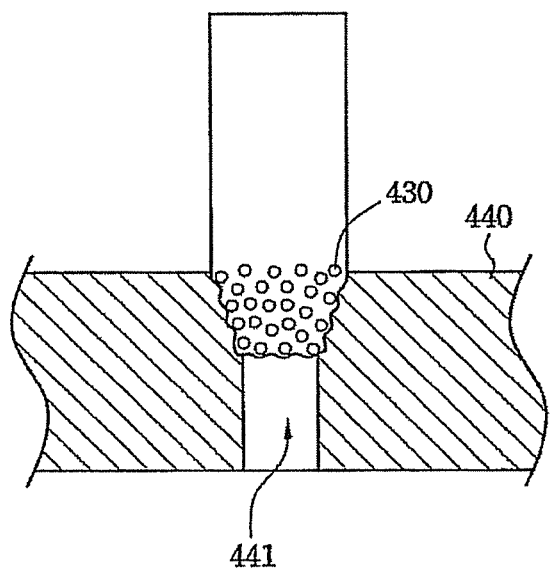
Figure 5F:
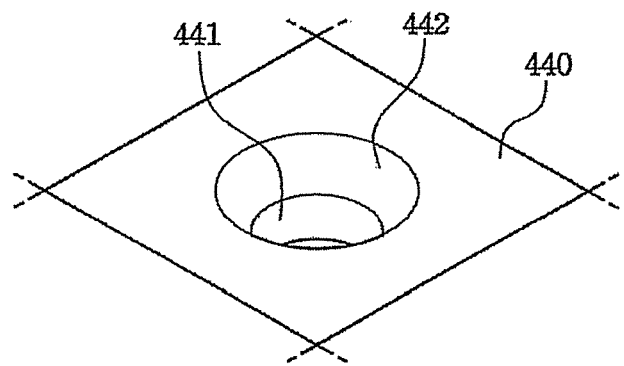

Referring to FIG. 5B, the diamonds are attached to the tapered portion of the press punch 400. Referring to FIG. 5C, the diamonds are removed to form a surface roughness 430 on the tapered portion of the press punch 400. Referring to FIGS. 5D and 5E, a cap plate 440 having an electrolyte injection hole 441 is prepared. The press punch 400 is inserted into the electrolyte injection hole 441, to form a tapered portion 442 on the electrolyte injection hole 441, as shown in FIG. 5F. Although not shown in FIG. 5F, the tapered portion 442 has a roughened surface.

While the tapered portion is shown in FIG. 5D, as being formed after the electrolyte injection hole 441 is formed, the electrolyte injection hole 441 may be formed with the tapered portion 442. The press punch 400 can then be used to roughen the surface of the tapered portion 442.

A leak pressure refers to a pressure that can be applied to the inside of a battery, before an electrolyte leaks through an electrolyte injection hole. According to aspects of the present invention, the desired leak pressure is generally 3 kgf/cm$^2$, or more. Generally, a leak pressure is 7 kgf/cm$^2$ is the highest leak pressure that is produced in a battery.

Figure 6:
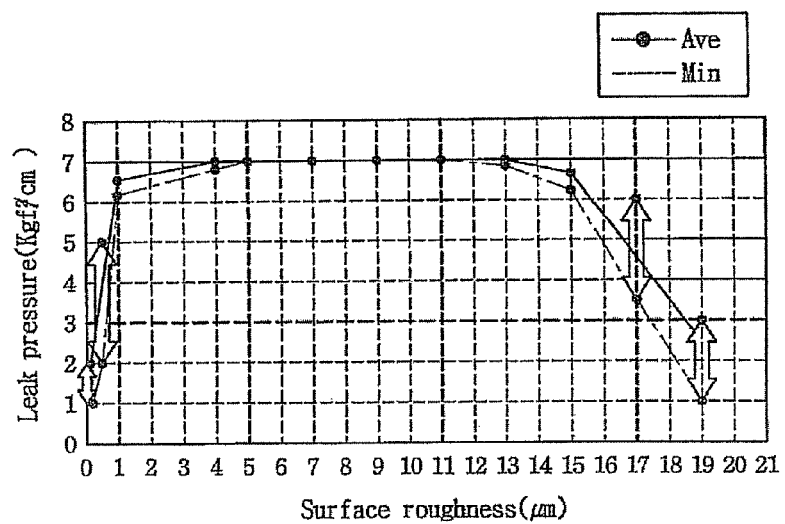
FIG. 6 is a graph of leak pressures versus surface roughnesses, of a tapered portion of an electrolyte injection hole.

FIG. 6 is a graph of leak pressures versus surface roughnesses of a tapered portion of an electrolyte injection hole. As shown in FIG. 6, when the surface roughness was 1 μm, an average value of the leak pressure was about 6.5 kgf/cm$^2$, and a minimum value thereof was about 6.2 kgf/cm$^2$. When the surface roughness was 17 μm, the average value of the leak pressure was about 4.5 kgf/cm$^2$, and the minimum value was about 3.5 kgf/cm$^2$.

When the surface roughness was from 5 μm to 11 μm, excellent sealing was obtained, in which each of the average value and the minimum value was 7 kgf/cm. In this case, the average value and the minimum value of the leak pressure were constant, at surface roughnesses ranging from 5 μm to 11 μm, because a maximum pressure of 7 kgf/cm$^2$ was applied inside of the battery. However, the electrolyte may not have leaked, even under a pressure exceeding 7 kgf/cm$^2$.

When the surface roughness was 0.5 μm, the average value of the leak pressure was about 4 kgf/cm$^2$, but the minimum value was about 2 kgf/cm$^2$, which is less than the desired 3 kgf/cm$^2$. This resulted in poor sealing characteristics.

When the surface of the tapered portion was not roughened, the average value of the leak pressure was about 2 kgf/cm$^2$, and the minimum value was about 1 kgf/cm$^2$, both of which were less than the desired 3 kgf/cm$^2$. This showed poor sealing characteristics.

When the surface roughness was 19 μm, the average value of the leak pressure was about 2.5 kgf/cm$^2$, and the minimum value was about 1 kgf/cm$^2$, both of which were less than the desired 3 kgf/cm$^2$. In this case, the reduction of the leak pressure, as the surface roughness of the tapered portion exceeded 17 μm, may have been because friction and adhesion were reduced, as the contact area of the sealing member and the resin was reduced, due to the high roughness. Thus, according to aspects of the present invention, the surface roughness of the tapered portion is generally from 1 μm to 17 μm, and more particularly, from 5 μm to 11 μm.

Figure 7:
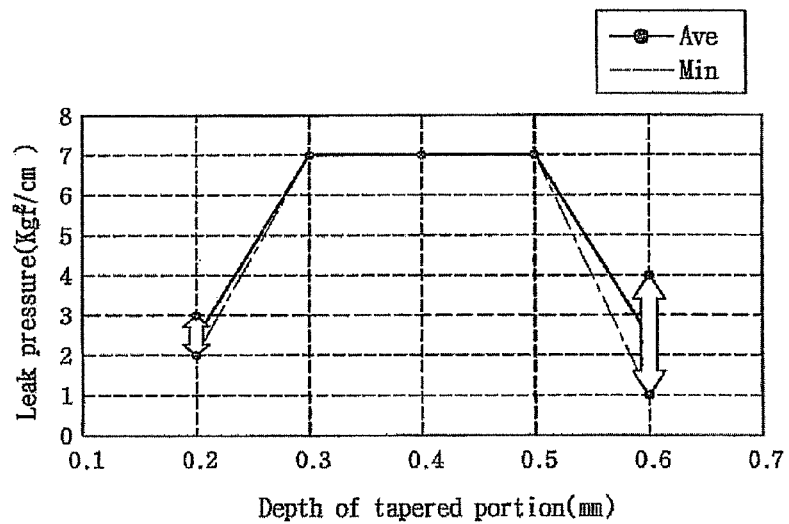
FIG. 7 is a graph of leak pressures versus depths, of a tapered portion of an electrolyte injection hole.

FIG. 7 is a graph of leak pressures versus depths of tapered portions of an electrolyte injection hole. In this case, the leak pressures were measured when the thickness of the cap plate was 0.8 mm, and the depths of the tapered portions were 0.2 mm, 0.3 mm, 0.4 mm, 0.5 mm, and 0.6 mm.

As shown in FIG. 7, when the depths of the tapered portion were 0.3 mm, 0.4 mm, and 0.5 mm, which corresponded to 37.5%, 50%, and 62.5% of the thickness of the cap plates, respectively, excellent sealing was obtained, in which each of the average value and the minimum value of the leak pressure was 7 kgf/cm$^2$. In this case, both the average value and the minimum value of the leak pressure were 7 kgf/cm$^2$, when the depths of the tapered portion ranged from 37.5% to 62.5% of the thickness of the cap plates. The electrolyte may not have leaked, even under pressures exceeding 7 kgf/cm$^2$.

However, it can be seen that when the depth of the tapered portion was 0.2 mm (corresponding to 25% of the thickness of the cap plate), the average value of the leak pressure was about 2.5 kgf/cm$^2$, and the minimum value was about 2 kgf/cm$^2$, both of which were less than the desired 3 kgf/cm$^2$. This showed poor sealing characteristics.

It can also be seen that when the depth of the tapered portion was 0.6 mm (corresponding to 75% of the thickness of the cap plate), the maximum value of the leak pressure was about 4 kgf/cm$^2$, but the average value was about 2.52 kgf/ cm², and the minimum value was about 2 kgf/cm², both of which were less than the desired 3 kgf/cm². This showed poor sealing characteristics. Thus, the depth of the tapered portion was shown to be suitable, at from 37.5% to 62.5% of the thickness of the cap plate.

Figure 8A:
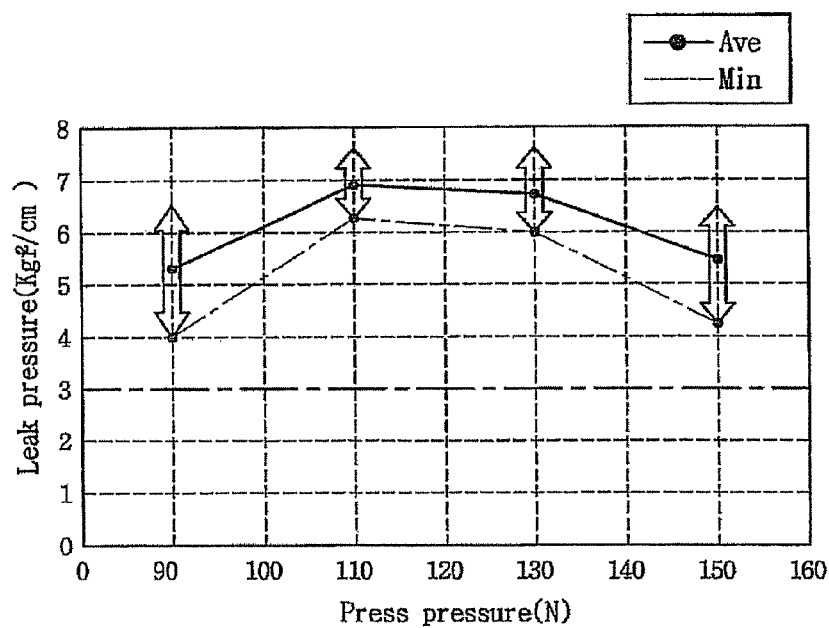
FIG. 8A is a graph of leak pressures when a fluorine resin is used.
Figure 8B:
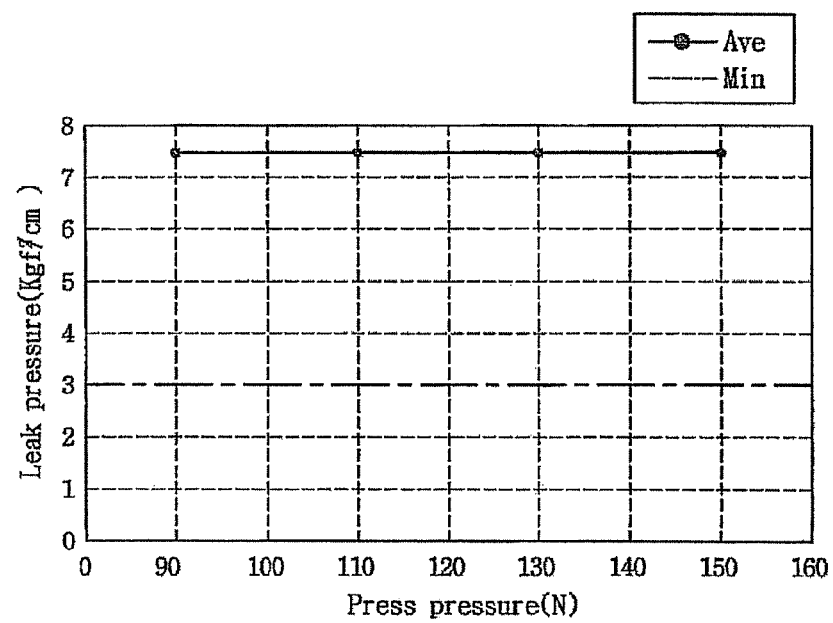
FIG. 8B is a graph of leak pressures when a polyimide resin is used.
Figure 8C:
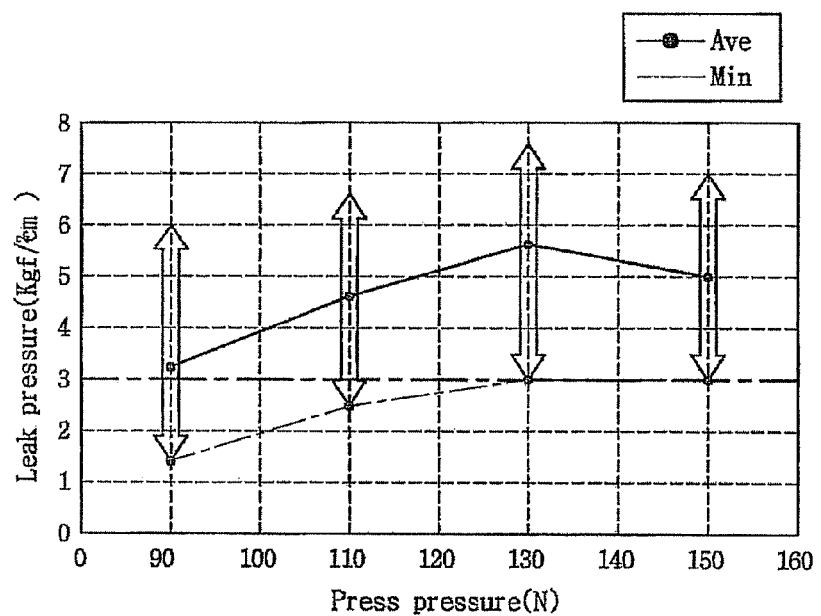
FIG. 8C is a graph of leak pressures when a natural-rubber resin is used.

FIGS. 8A to 8C are graphs of leak pressures depending on the types of the resins coated on the caps of sealing members. FIG. 8A is a graph of leak pressures when a fluorine resin was used, FIG. 8B is a graph of leak pressures when a polyimide resin was used, and FIG. 8C is a graph of leak pressures when a natural-rubber resin (ethylene propylene diene monomer (EPDM) rubber) was used. The leak pressures of each resin were measured at pressing pressures of from 90N to 150N.

It can be seen from FIG. 8A that the fluorine resin provided excellent sealing characteristics, under pressing pressures ranging from 110N to 130N. The average value and the minimum value of the leak pressures were 6 kgf/cm², or more. It can also be seen that when the pressing pressure was 90N, the average value of the leak pressure was about 5.3 kgf/cm², and the minimum value was about 4 kgfv. When the pressing pressure was 150N, the average value of the leak pressure was about 5.5 kgf/cm², and the minimum value was about 4.2 kgf/cm². Thus, it can be seen that the fluorine resin provided excellent sealing, under pressing pressures ranging from 90N to 150N, and the average value and the minimum value of the leak pressure were at least 3 kgf/cm².

It can be seen from FIG. 8B that the polyimide resin provided excellent sealing, under pressing pressures ranging from 110N to 130N. In this case, the average value and the minimum value of the leak pressure were 7.5 kgf/cm², when the pressing pressures ranged from 110N to 130N. The electrolyte may not have leaked, even under pressing pressures exceeding 7.5 kgf/cm².

It can also be seen from FIG. 8C that the natural-rubber resin (ethylene propylene diene monomer (EPDM) rubber) provided excellent sealing, under the pressing pressures ranging from 130N to 150N, and the average value and the minimum value of the leak pressure were 3 kgf/cm², or more. However, when the pressing pressure was 110N, the average value of the leak pressure was about 4.6 kgf/cm², and the minimum value was about 2.5 kgf/cm². When the pressing pressure was 90N, the average value of the leak pressure was about 3.2 kgf/cm², and the minimum value was about 1.4 kgf/cm², both of which were less than the desired 3 kgf/cm². This showed poor sealing characteristics.

Thus, according to aspects of the present invention, the resin can be a polyimide resin or a fluorine resin, in order to have the most improvement of a sealing force between an electrolyte injection hole and a sealing member.

Figure 9:
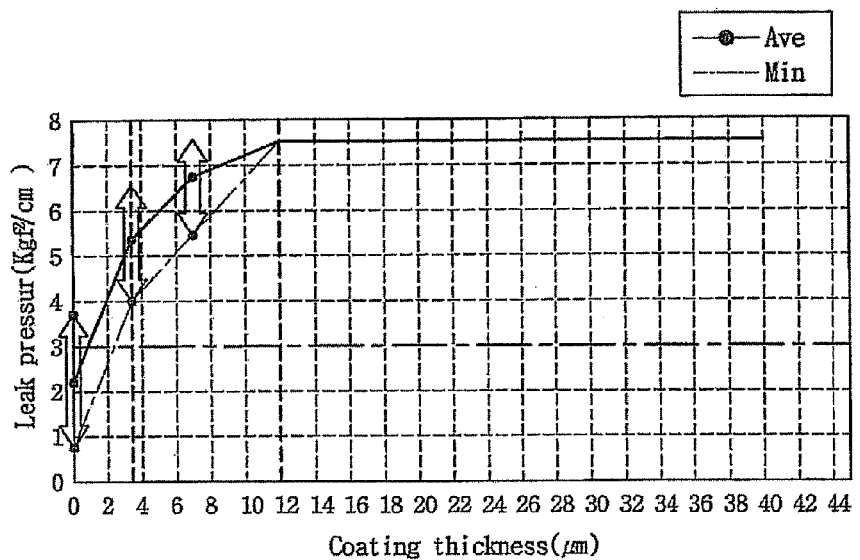
FIG. 9 is a graph of leak pressures versus thicknesses, of a resin coated on a cap of a sealing member.

FIG. 9 is a graph of leak pressures versus coating thicknesses of resins, after being compressed between caps of sealing members and tapered portions. In this case, the coated resin was a polyimide resin, and the coating thicknesses refer to a total coating thickness of opposing sides of a resin layer, after the resin is compressed. It can be seen from FIG. 9 that when the total thickness of the resin was 3.5 μm (i.e., the thickness of the resin was 1.75 μm excellent sealing characteristics were obtained, and the average value of the leak pressure was about 5.3 kgf/cm², and the minimum value was 4 kgf/cm². In particular, the when the total thickness of the resin was 12 μm to 40 μm (i.e., the thickness of the resin was from 6 μm to 20 μm excellent sealing characteristics were obtained. In this case, both the average value and the minimum value of the leak pressure were 7 kgf/cm², because a maximum pressure of 7.5 kgf/cm² was applied to the inside of the battery. A pressure exceeding 7.5 kgf/cm² may not have caused a leakage of the electrolyte.

However, it can be seen that when the total thickness of the resin was 2 μm (i.e., the thickness of the resin was 1 μm), the average value of the leak pressure was about 4 kgf/cm², and the minimum value was about 2.7 kgf/cm², which was less than the desired 3 kgf/cm². This indicated poor sealing characteristics.

When no resin is coated, the average value of the leak pressure was about 2.2 kgf/cm², and the minimum value was about 0.8 kgf/cm², both of which are less than the desired 3 kgf/cm². This showed poor sealing characteristics.

Thus, the coating thickness of the resin, after compression, should generally be from 1.75 μm to 20 μm. For example, the coating thickness can be 6 μm to 10 μm. The upper limit of the coating thickness should generally be limited to 20 μm, so as not to complicate manufacturing, or unnecessarily increase the total size of a sealing member.

Figure 10:
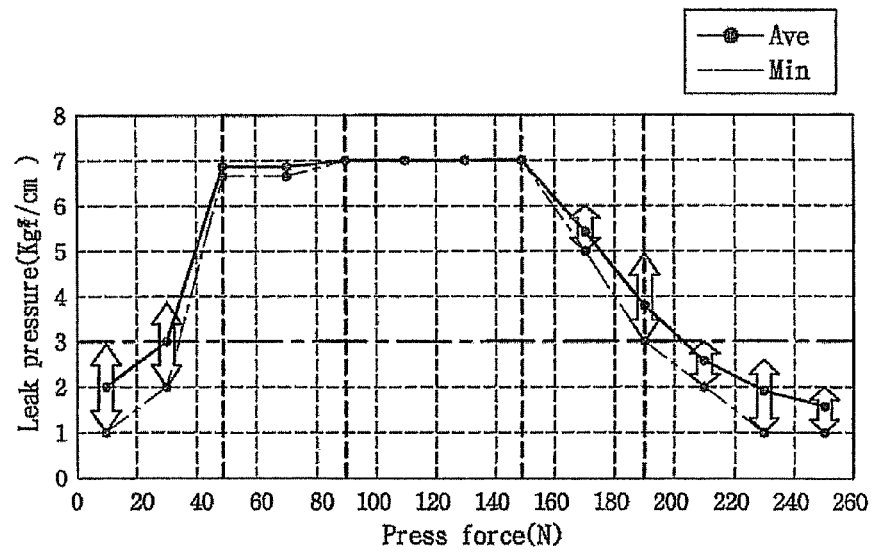
FIG. 10 is a graph of leak pressures versus pressing forces, of a sealing member.

FIG. 10 is a graph of leak pressures versus pressing forces (pressing pressure) applied to a sealing member. In this case, the cap of the sealing member was formed of aluminum and was ball-shaped. The size of the cap was 1.1φ, and the size of the sealing member was 1.13φ, after the cap was coated with a polyimide resin. The thickness of the cap plate was 0.8 mm, the maximum diameter of the electrolyte injection hole was 1.3 mm, the minimum diameter of the electrolyte injection hole was 0.9 mm, the depth of the tapered portion was 0.4 mm (corresponding to 50% of the thickness of the cap plate), and the surface roughness of the tapered portion was 10 μm.

As can be seen from FIG. 10, when the pressing force was 50N, the average value of the leak pressure was about 7.8 kgf/cm², and the minimum value was about 7.6 kgf/cm². When the pressing pressure was 190N, the average value of the leak pressure was about 3.8 kgf/cm², and the minimum value was about 3 kgf/cm². The pressing forces of from 90N to 150N provided excellent sealing characteristics, in which each of the average value and the minimum value of the leak pressure was 7 kgf/cm².

In this case, both the average value and the minimum value of the leak pressure were set to 7 kgf/cm², because a maximum pressure of 7 kgf/cm² is generally formed inside of a battery. A pressure exceeding 7 kgf/cm² may not necessarily have caused a leakage of the electrolyte.

However, it can be seen that when the pressing force was 300N, the average value of the leak pressure was about 3 kgf/cm², and the minimum value was about 2 kgf/cm², which was less than the desired 3 kgf/cm². This indicated poor sealing characteristics.

It can also be seen that when the pressing pressure was 10N, the average value of the leak pressure was about 2 kgf/cm², and the minimum value was about 1 kgf/cm², both of which were less than the desired 3 kgf/cm². This showed poor sealing characteristics.

It can also be seen that when the pressing pressure was 210N, the average value of the leak pressure was about 2.6 kgf/cm², and the minimum value was about 2 kgf/cm², neither of which satisfied the desired leak pressure of 3 kgf/cm². This indicated poor sealing characteristics. In this case, the reduction of the leak pressures, at pressing pressures exceeding 190N, was caused by the deformation of the cap plate, which caused the resultant reduction of the sealing force.

According to aspects of the present invention, a pressing force of from 50N to 190N, or from 90N to 150N, is applied to a sealing member, by a pressing device. Accordingly, aspects of the present invention provide a secondary battery having an electrolyte injection hole having excellent sealing characteristics.

Aspects of the present invention can also provide a secondary battery having high productivity, by eliminating need for a cap welding process. Aspects of the present invention can also provide a secondary battery capable of suppressing the formation of a pin hole, by eliminating the need for a cap welding process.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A secondary battery comprising a cap plate comprising:
   an electrolyte injection hole that extends between inner and outer surfaces of the cap plate, the electrolyte injection hole comprising a conical section having a serrated surface with a surface roughness of from 5 μm to 11 μm; and
   a sealing member configured to seal the electrolyte injection hole, wherein the sealing member comprises a cap and a resin coated on the cap, and wherein the resin consists of a layer with a thickness of from 6 μm to 20 μm.

2. The secondary battery of claim 1, wherein the conical section has a maximum width at the outer surface of the cap plate.

3. The secondary battery of claim 1, wherein the conical section extends to a depth corresponding to from 37.5% to 62.5% of a thickness of the cap plate.

4. The secondary battery of claim 1, wherein the thickness of the cap plate is from 0.7 mm to 1.0 mm.

5. The secondary battery of claim 1, wherein opposing sides of the conical section form an angle of from 43° to 68°.

6. The secondary battery of claim 1, wherein the conical section forms an angle of from 56° to 69°, with respect to the inner surface of the cap plate.

7. The secondary battery of claim 1, wherein:
   the electrolyte injection hole has a maximum diameter of from 1.1 mm to 1.5 mm;
   a minimum diameter of from 0.7 mm to 1.1 mm; and
   the maximum diameter is larger than the minimum diameter.

8. The secondary battery of claim 7, wherein the conical section extends to a depth of from 37.5% to 62.5% of a thickness of the cap plate, and
   the maximum diameter of the conical section is disposed at the outer surface of the cap plate.

9. The secondary battery of claim 1, wherein:
   the depth of the conical section is 4 mm;
   the thickness of the cap plate is 8 mm;
   the maximum diameter of the electrolyte injection hole is 1.3 mm;
   the minimum diameter of the electrolyte injection hole is 0.9 mm; and
   the maximum diameter is disposed at the outer surface of the cap plate.

10. The secondary battery of claim 1, wherein the resin contacts the conical section, to seal the electrolyte injection hole.

11. The secondary battery of claim 1, wherein the thickness of the resin is reduced by from 40% to 60%, when the sealing member seals the electrolyte injection hole.

12. The secondary battery of claim 1, wherein the resin is a polyimide resin, a fluorine resin, or a natural-rubber resin.

13. The secondary battery of claim 1, wherein the resin is a polyimide resin.

14. The secondary battery of claim 1, further comprising a UV cured layer coated on the sealing member and the outer surface of the cap plate.

* * * * *